(12) United States Patent
Cutler et al.

(10) Patent No.: US 9,361,581 B2
(45) Date of Patent: Jun. 7, 2016

(54) METHOD FOR LOADING A RULE SET IN A RULE ENGINE

(75) Inventors: Kevin Scott Cutler, Carp (CA); Katha Kulasingam, Ottawa (CA); Felix Katz, Ottawa (CA); Matthew Yee, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 1398 days.

(21) Appl. No.: 12/827,949

(22) Filed: Jun. 30, 2010

(65) Prior Publication Data

US 2012/0005145 A1  Jan. 5, 2012

(51) Int. Cl.
*G06F 17/00* (2006.01)
*G06N 5/02* (2006.01)

(52) U.S. Cl.
CPC ................................ *G06N 5/025* (2013.01)

(58) Field of Classification Search
None
See application file for complete search history.

(56) References Cited

U.S. PATENT DOCUMENTS

| 7,478,426 B2 * | 1/2009 | Corl et al. ................ 726/13 |
| 2007/0056030 A1 * | 3/2007 | Kay ........................ 726/11 |

* cited by examiner

*Primary Examiner* — Li-Wu Chang
(74) *Attorney, Agent, or Firm* — Kramer & Amado, P.C.

(57) ABSTRACT

A method of exchanging a rules engine decision tree cache is disclosed. The method provides for provision accepting a command to build a replacement rules engine decision tree cache, replacing the existing cache if the decision tree creation process is successful, retaining the existing cache if the decision tree creation process is not successful, and providing specific error messages in the event that the replacement fails. The method allows an network operator to change the rules for the rule engine without disruption of real-time service and allows for a level of error checking prior to provisioning the new decision tree.

10 Claims, 3 Drawing Sheets

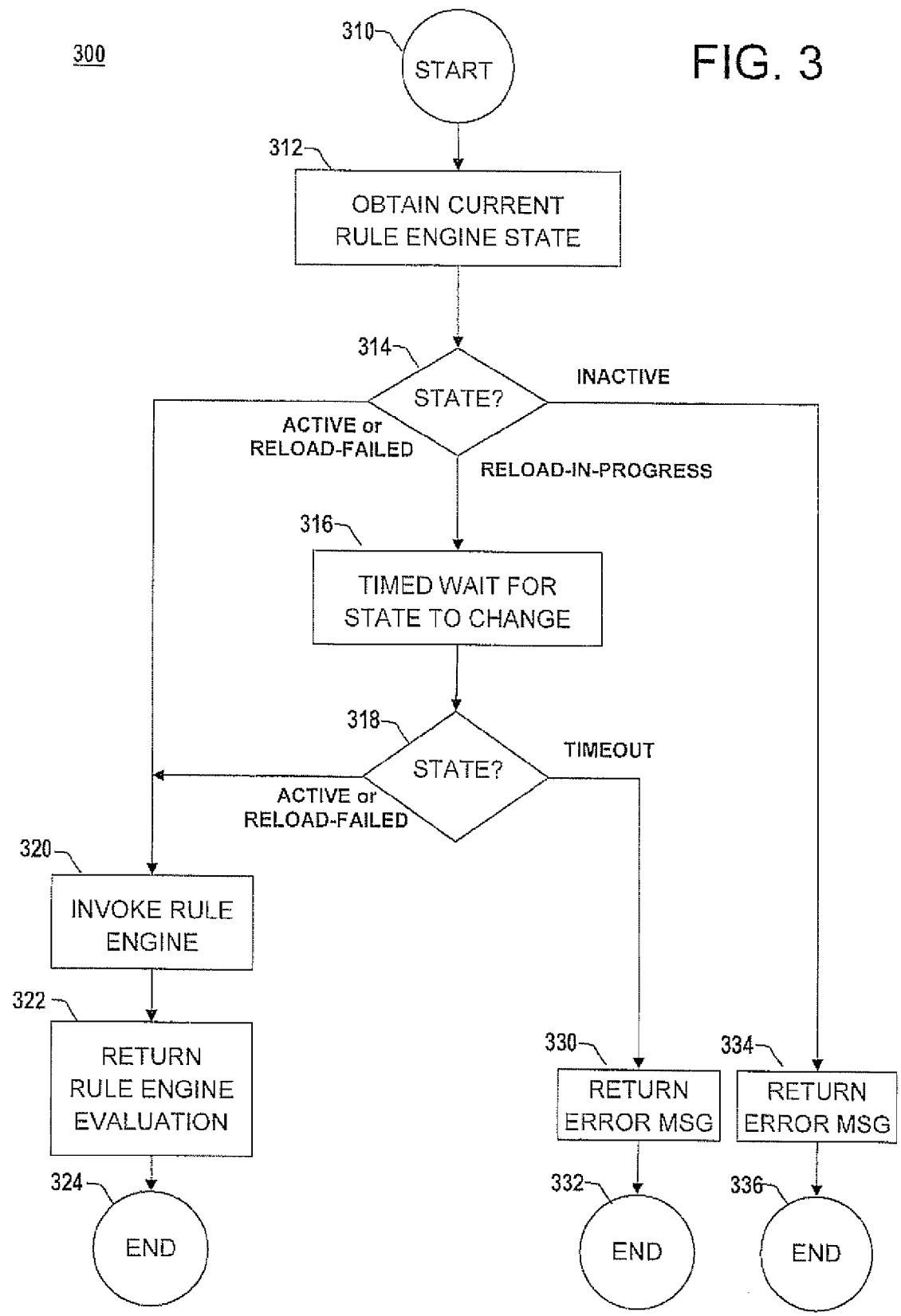

METHOD FOR LOADING A RULE SET IN A RULE ENGINE

FIELD OF THE INVENTION

The invention relates to caching of decision trees used by a rules engine and is particularly concerned with swapping of an operating cache for a replacement cache with minimum impact to real-time processing by the rules engine.

BACKGROUND OF THE INVENTION

As demand increases for varying types of applications within mobile telecommunications networks, service providers constantly upgrade their systems in order to reliably provide an expanded functionality. What was once a system designed simply for voice communication has grown into an all-purpose network access point, providing access to a myriad of applications including text messaging, multimedia streaming, and general Internet access. In order to support such applications, providers have built new networks on top of their existing voice networks. As seen in second and third generation networks, voice services must be carried over dedicated voice channels and directed toward a circuit-switched core, while other service communications are transmitted according to the Internet protocol (IP) and directed toward a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it terms "long term evolution" (LTE). In an LTE network, all communications are carried over an IP channel from user equipment (UE) to an all-IP core called the evolved packet core (EPC). The EPC then provides gateway access to other networks while ensuring an acceptable QoE and charging a subscriber for their particular network activity.

The 3GPP generally describes the components of the EPC and their interactions with each other in a number of technical specifications. Specifically, 3GPP TS 29.212, 3GPP TS 29.213, and 3GPP TS 29.214 describe the policy and charging rules function (PCRF), policy and charging enforcement function (PCEF), and bearer binding and event reporting function (BBERF) of the EPC. These specifications further provide some guidance as to how these elements interact in order to provide reliable data services and charge subscribers for use thereof.

For example, 3GPP TS 29.212 and 3GPP TS 29.214 provide some guidance on the establishment of an application session by the EPC upon receipt of an application request from an application function (AF) in the form of an aa-request (AAR) message or from a packet data network gateway (PGW) in the form of a credit control request (CCR) message. The standards specify that the PCRF is responsible for receiving requests, establishing IP-CAN and gateway control sessions, creating new policy and charging control (PCC) rules commensurate with such requests, and providing these new PCC rules to the PCEF for installation. The 3GPP standards also define the format of various messages and PCC rules.

The main objective of the PCRF is to provide QoS information about an IP-CAN (default bearer QoS) or explicit application session (dedicated bearer). Standards and sound engineering practices dictates a default mapping which is outlined in the 3GPP architecture but it is often overridden by business requirements or regulatory constraints.

One method of doing this is to map an application request in the traffic policy to be pushed to the PCEF (PGW or GGSN). The logic behind this mapping is implemented in a rules engine, which can be modified by the introduction of a new rule (that is, if condition, then action). A rules engine can implement an event-driven forward-chaining rule evaluation algorithm using production style rules with flexible interconnects to external decision points.

In one such version of a rules engine, rules are in a simple "Condition and Action" format where conditions can be described using PCRF parameters and the attributes that are communicated with:
SPR (via Sp)
PCEF (via Gx)
AF (via Rx)
internal triggers
internal session state Due to changes in the network and business requirements and opportunities it is necessary to change the rules that the rule engine is applying, however, such a change should result in minimal service disruption.

In view of the foregoing, it would be desirable to provide a flexible method of changing the specific set of rules applied by a rules engine. In particular, it would be desirable to provide a method by which a rule set for a rule engine may be updated with minimal service interruptions.

SUMMARY OF THE INVENTION

It is an object of the invention to provide a means of changing a rule set for a rule engine in a PCRF network device with minimal service interruptions. In particular, the transition from one rule set to another rule set will be done in a graceful manner in respect of already-in-progress message processing.

According to an aspect of the invention there is provided a method for loading a new rule set in a rules engine, the method having the steps of initiating a rule engine reload; building a new decision tree from the rule set; storing the new decision tree in a temporary cache; changing the rule engine state to a reloading-in-progress state; updating the rules cache with the new decision tree from the temporary cache; and changing the rule engine state to an active state.

In another embodiment of the invention, there are further steps of prior to changing the rule engine state to a reloading-in-progress state, checking the state of the rule engine; and if the rule engine is in an inactive state, then after the step of changing the rule engine state to a reloading-in-progress state, checking if the new decision tree building was a success, and if it was not a success, then changing the rule engine state to a reload-failed state; and if it was a success, then updating the rule cache with the contents of the temporary rule cache, and changing the rule engine state to active.

In yet another embodiment of the invention, there may be the steps of prior to changing the rule engine state to a reloading-in-progress state, checking the state of the rule engine; and if the rule engine is in an active state, then after the step of changing the rule engine state to a reloading-in-progress state, checking if the new decision tree building was a success, and if it was a success, then updating the rule cache with the contents of the temporary rule cache, and changing the rule engine state to active; and if it was not a success, then sending an error message, and changing the rule engine state to active.

Note: in the following the description and drawings that follow merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

BRIEF DESCRIPTION OF THE DRAWINGS

The present invention will be further understood from the following detailed description of embodiments of the invention, with reference to the drawings in which:

FIG. 3 illustrates a flow diagram of a method for accessing a rule engine in accordance with an embodiment of the present invention.

In the following figures, like features bear similar reference labels.

DETAILED DESCRIPTION

Figure 1:
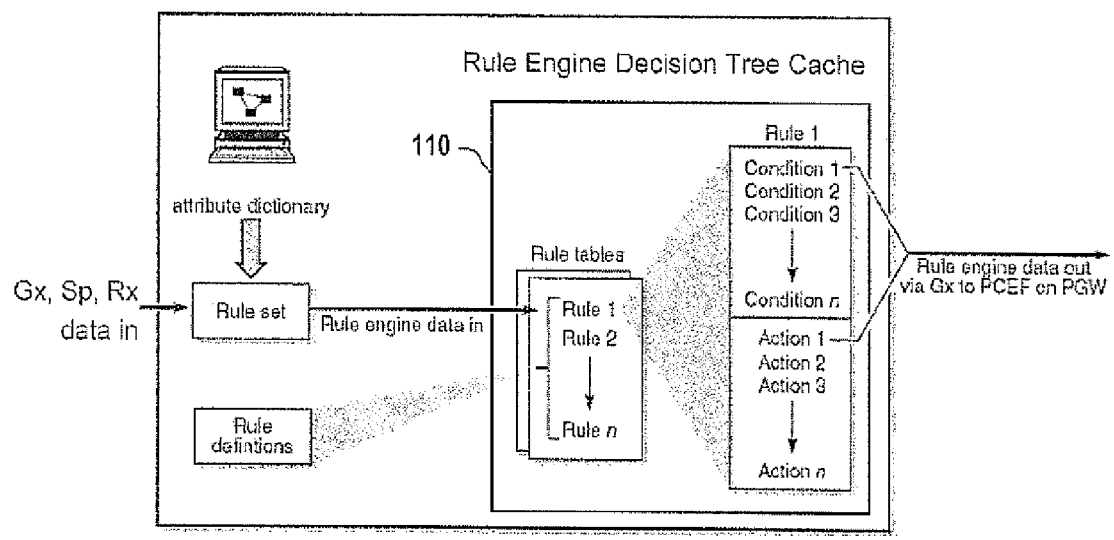
FIG. 1 illustrates a functional block diagram for a rule engine cache accordance with an embodiment of the present invention.

A rule engine is provided with a cache containing a decision tree. The decision tree is a compiled version of the rule set which governs how the PCRF parameters and conditions are to be responded to. Referring to FIG. 1 there may be seen a functional block representation of the rule engine with rule engine decision tree cache 110.

Figure 2:
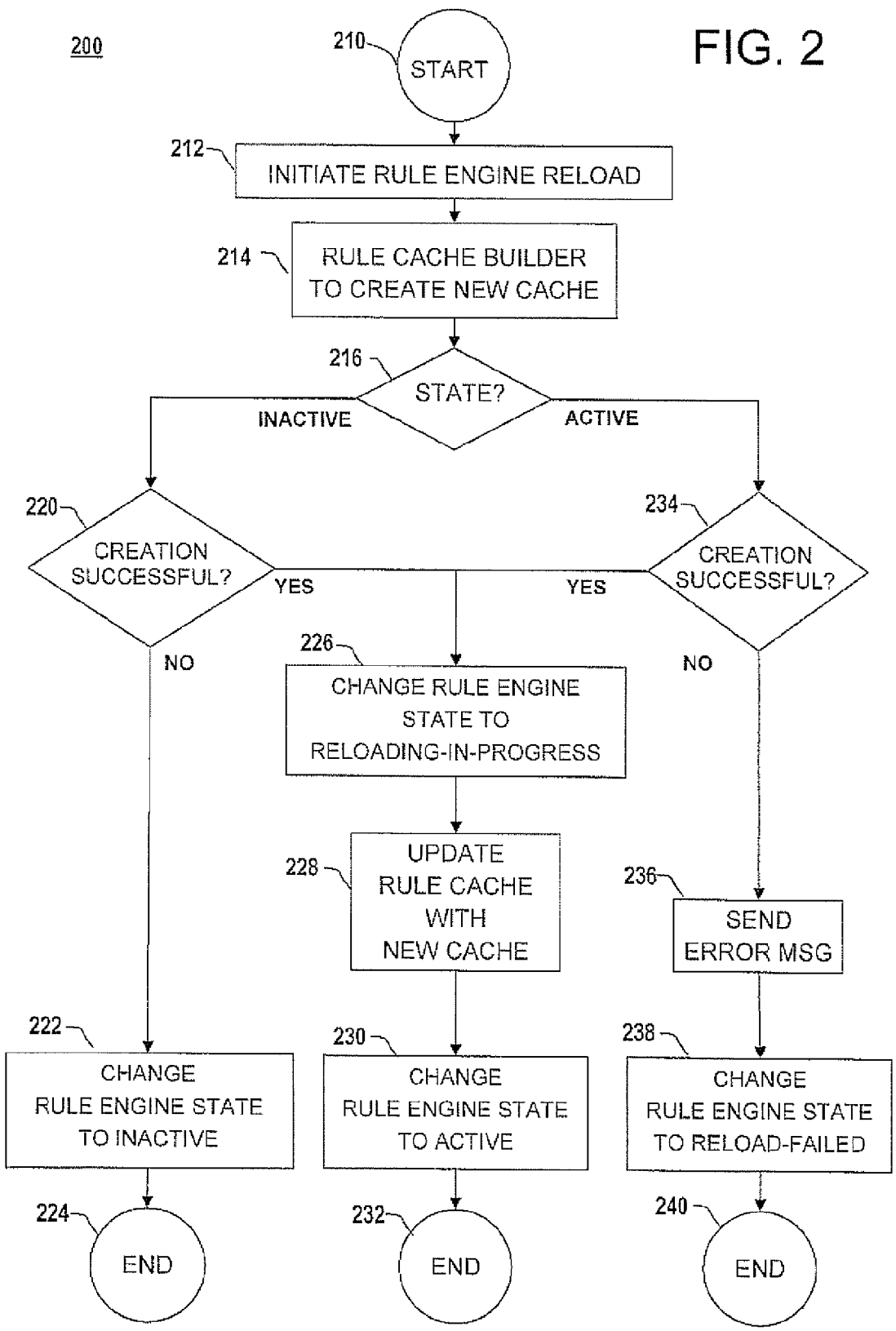
FIG. 2 illustrates a flow diagram of a method for updating a rules cache for a rule engine in accordance with an embodiment of the present invention.

FIG. 2 illustrates an exemplary method for changing a rule set for a rule engine in a PCRF network device with minimal service interruptions.

Method 200 may begin in step 210 and proceed to step 212 where a rule engine reload is initiated. This is typically, but not exclusively at operator request bequest. At 214 the rule cache builder function creates a new decision tree rules cache from the new rule set. At 216 the state of the rule engine is queried.

In the event the rule engine state is INACTIVE, there is an associated meaning that the rule engine is not running. It may be also assumed that there is not an operable decision tree in the rule engine cache. At 220 a query determines if the rule cache builder successfully built the new decision tree cache. If the results of the query indicate that the creation was not successful, at 222 the rule engine state is changed to INACTIVE and the method stops at 224.

In the event that the results of query 220 indicate that the creation was successful, at 226 the rule engine state is changed to RELOADING-IN-PROGRESS, and at 228 the rule cache is updated with the new cache. The RELOADING-IN-PROGRESS state is used to preclude accessing the rule engine during the brief time it is undergoing reloading. At 230 the rule engine state is changed to ACTIVE, and the method stops at 232.

In the event that the state of the rule engine at query 216 was determined to be ACTIVE, there is an associated implication that the rule engine is running, and that there is therefore an operable decision tree in the rule engine cache. At 234 a query determines if the rule cache builder successfully built the new decision tree cache. In the event that the results of query 234 indicate that the creation was successful, at 226 the rule engine state is changed to RELOADING-IN-PROGRESS, and at 228 the rule cache is updated with the new cache. At 230 the rule engine state is changed to ACTIVE, and the method stops at 232.

In the event that the query at step 234 determined that the rule cache builder did not successfully build the new decision tree cache at 236 an error message is produced, indicating an unsuccessful creation. This may be due to a number of reasons, including determination of errors in the rule set when the rule cache builder is converting the rule set into a decision tree. At 238 the rule engine state is changed to RELOAD-FAILED, and the method stops at 240. Note that this path commenced with a determination that the rule engine was in an ACTIVE state and had an operable decision tree in the rule engine cache. In the event that there was an unsuccessful new cache build, it is desirable to allow the operation to continue with the existing decision tree cache and this will occur, but with the state continuing as RELOAD-FAILED as opposed to ACTIVE.

Referring to FIG. 3 there may be seen an exemplary method for invoking a rule engine which coordinates with the method of FIG. 2 in order allow for rule set decision tree cache changes without substantial service interruptions.

Method 300 may begin in step 310 and proceed to step 312 where the state of the rule engine is obtained. At 314 the state is tested.

In the event that the state of the rule engine is ACTIVE or RELOAD-FAILED, the rule engine is invoked at step 320 and returns the evaluation results at step 322. The method then stops at step 324.

In the event that the state of the rule engine is INACTIVE, an error message is returned at step 334 and the method then stops at step 336.

In the event that the state of the rule engine is RELOAD-IN-PROGRESS, then a change of rule set decision trees is occurring and the rule engine cannot service the request at this immediate point in time. A timed wait state is entered at step 316 and the state of the rule engine is monitored.

If the rule engine state changes to ACTIVE or RELOAD-FAILED prior to the timed wait state timing out, then control proceeds to step 320 whereat the rule engine is invoked and returns the evaluation results at step 322. The method then stops at step 324.

If the timed wait state expires, then the method proceeds to step 330 whereat an error message is returned. The method then stops at step 332.

In each of these scenarios, the error message returned appropriately indicates the condition which generated it.

In summary, a method has been disclosed which provides a means to change a rule engine decision tree cache from an existing cache to a replacement cache. The method uses state indicators to coordinate the actions of the rule engine with the change method, and uses error messages to indicate to the operator the conditions which precluded a cache change.

It is to be understood that various changes in the details, materials, and arrangements of the parts which have been described and illustrated in order to explain the nature of this invention may be made by those skilled in the art without departing from the scope of the invention as expressed in the following claims.

It should also be understood that the steps of the exemplary methods set forth herein are not necessarily required to be performed in the order described, and the order of the steps of such methods should be understood to be merely exemplary.

Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation." Numerous modifications, variations and adaptations may be made to the embodiment of the invention described above without departing from the scope of the invention, which is defined in the claims.

What is claimed is:

1. A method for loading a new rule set in a rules cache in a rules engine, the method comprising the steps of:
   initiating a rule engine reload;
   building a new decision tree from the rule set;
   storing said new decision tree in a temporary cache;
   changing the rule engine state to a reloading-in-progress state;
   updating the rules cache with the new decision tree from said temporary cache; and
   changing the rule engine state to an active state.

2. A method as claimed in claim 1, further comprising the steps of:
   prior to changing the rule engine state to a reloading-in-progress state,
   checking the state of the rule engine; and
   if the rule engine is in an inactive state, then after the step of changing the rule engine state to a reloading-in-progress state,
      checking if the new decision tree building was a success, and
         if it was not a success, then changing the rule engine state to a reload-failed state; and
         if it was a success, then updating the rule cache with the contents of the temporary rule cache, and changing the rule engine state to active.

3. A method as claimed in claim 1, further comprising the steps of:
   prior to changing the rule engine state to a reloading-in-progress state,
   checking the state of the rule engine; and
   if the rule engine is in an active state, then after the step of changing the rule engine state to a reloading-in-progress state,
      checking if the new decision tree building was a success, and
         if it was a success, then updating the rule cache with the contents of the temporary rule cache, and changing the rule engine state to active; and
         if it was not a success, then sending an error message, and changing the rule engine state to active.

4. A method for loading a new rule set in a rules engine, the method comprising:
   generating a new set of rule cache data;
   changing a state of the rule engine to a reloading-in-progress state, wherein the reloading-in-progress state precludes invocation of the rules engine;
   storing the new set of rule cache data in a rule cache of the rules engine while the state of the rule engine is in the reloading-in-progress state; and
   after storing the new set of rule cache data in the rule cache, changing the state of the rule engine to an active state.

5. The method of claim 4, wherein changing the state of the rule engine to the reloading-in-progress state is performed based on the successful generation of the new set of rule cache data.

6. The method of claim 5, further comprising;
   based on the unsuccessful generation of the new set of rule cache data, changing the state of the rule engine to a reload-failed state,
   wherein, after changing the state of the rule engine to the reload-failed state, the rule cache stores an old set of rule cache data for use by the rule engine.

7. The method of claim 5, further comprising:
   based on the unsuccessful generation of the new set of rule cache data and the state of the rule engine being an inactive state, leaving the rule engine in the inactive state.

8. The method of claim 4, wherein the new set of rule cache data is a decision tree.

9. The method of claim 4, further comprising:
   receiving an operator request to perform a rule engine reload,
   wherein generating the new set of rule cache data is performed in response to receiving the operator request.

10. The method of claim 4, wherein generating the new set of rule cache data comprises converting an operator-provided rule set into a form usable at run-time.

* * * * *